United States Patent
Kobyakov et al.

(10) Patent No.: US 10,209,450 B2
(45) Date of Patent: Feb. 19, 2019

(54) METHODS FOR COUPLING OF WAVEGUIDES WITH DISSIMILAR MODE FIELD DIAMETERS, AND RELATED APPARATUSES, COMPONENTS, AND SYSTEMS

(71) Applicant: Corning Optical Communications LLC, Hickory, NC (US)

(72) Inventors: Andrey Kobyakov, Painted Post, NY (US); Sergey Anatol'evich Kuchinsky, St. Petersburg (RU); Xue Liu, Advance, NC (US); Aramais Robert Zakharian, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/409,962

(22) Filed: Jan. 19, 2017

(65) Prior Publication Data

US 2017/0131472 A1 May 11, 2017

Related U.S. Application Data

(63) Continuation of application No. PCT/US2015/044432, filed on Aug. 10, 2015.

(Continued)

(51) Int. Cl.
*G02B 6/30* (2006.01)
*G02B 6/122* (2006.01)
(Continued)

(52) U.S. Cl.
CPC .......... *G02B 6/305* (2013.01); *G02B 6/1228* (2013.01); *G02B 6/14* (2013.01); *G02B 6/2826* (2013.01);
(Continued)

(58) Field of Classification Search
None
See application file for complete search history.

(56) References Cited

U.S. PATENT DOCUMENTS 6,330,378 B1    12/2001    Forrest et al.
6,597,833 B1    7/2003    Pi et al.
(Continued)

FOREIGN PATENT DOCUMENTS

JP    4-283704 A    *   10/1992
WO    2013188592 A1    12/2013

OTHER PUBLICATIONS

Patent Cooperation Treaty, International Search Report and Written Opinion for PCT/US2015/044432, dated Oct. 20, 2015, 13 Pages.
(Continued)

*Primary Examiner* — Michael Stahl
(74) *Attorney, Agent, or Firm* — Robert L. Branham (57) ABSTRACT

Methods for coupling of waveguides with dissimilar mode field diameters, and related apparatuses, components, and systems are disclosed. In one example, a waveguide coupling assembly includes an input waveguide having a first mode, and a transition waveguide having a first transition waveguide section, a second transition waveguide section, and a tapered section. The first transition waveguide section has a second mode and is disposed proximate to the input waveguide such that a phase matching condition is achieved between the input waveguide and the first transition waveguide section, thereby evanescently coupling the input waveguide to the first transition waveguide section of the transition waveguide. The tapered section is optically connected between the first transition waveguide section and the second transition waveguide section, such that the second (Continued)

mode of the first transition waveguide section is converted to the third mode of the second transition waveguide section by the tapered section.

19 Claims, 5 Drawing Sheets

Related U.S. Application Data (60) Provisional application No. 62/037,747, filed on Aug. 15, 2014.

(51) Int. Cl.
  *G02B 6/14* (2006.01)
  *G02B 6/28* (2006.01)
  *G02B 6/12* (2006.01)

(52) U.S. Cl.
  CPC ............ *G02B 2006/12147* (2013.01); *G02B 2006/12195* (2013.01)

(56) References Cited

U.S. PATENT DOCUMENTS

| | | | |
|---|---|---|---|
| 6,625,349 B2 | 9/2003 | Zhao et al. | |
| 6,697,551 B2 | 2/2004 | Lee et al. | |
| 6,996,316 B2 | 2/2006 | Bailey et al. | |
| 7,079,727 B1* | 7/2006 | Little | G02B 6/1228 385/130 |
| 8,213,751 B1 | 7/2012 | Ho et al. | |
| 8,320,721 B2 | 11/2012 | Cevini et al. | |
| 8,483,528 B2 | 7/2013 | Socci et al. | |
| 2002/0159703 A1 | 10/2002 | McGreer | |
| 2010/0040327 A1* | 2/2010 | Deki | G02B 6/1228 385/28 |
| 2011/0026880 A1 | 2/2011 | Galli et al. | |
| 2011/0268446 A1 | 11/2011 | Cune et al. | |
| 2015/0219853 A1* | 8/2015 | Kumar | G02B 6/305 385/14 |
| 2015/0247974 A1* | 9/2015 | Painchaud | G02B 6/305 385/14 |

OTHER PUBLICATIONS

P. Cheben et al., "Refractive Index Engineering With Subwavelength Gratings for Efficient Microphotonic Couplers and Planar Waveguide Multiplexers," Opt. Lett. vol. 35, No. 15, p. 2526 (2010).

P. Cheben, et al., "Subwavelength Waveguide Grating for Mode Conversion and Light Coupling in Integrated Optics," Optics Express, vol. 14, May 29, 2006, pp. 4695-4702.

M. Galarza et al, "Compact and Highly-Efficient Polarization Independent Vertical Resonant Couplers for Active-Passive Monolithic Integration", Opt. Express 16(12), pp. 8350-8358 (2008).

C. Gu and P. Yeh, "Form Birefringence Dispersion in Peridioc Layered Media," Optics Letters, vol. 21, No. 7,. Apr. 1, 1996, pp. 504-506.

P. Lalanne and J.-P. Hugonin, "High-Order Effective-Medium Theory of Subwavelength Gratings in Classical Mounting: Application to Volume Holograms", J. Opt. Soc. Am. A, vol. 15, No. 7, p. 1843 (1998).

G. Roelkens, D. Van Thourhout, and R. Baets, "High Efficiency Silicon-On-Insulator Grating Coupler Based on a Poly-Silicon Overlay," Opt. Express 14(24), pp. 11622-11630 (2006).

Snyder B., and P. O'Brien, "Packaging Process for Grating-Coupled Silicon Photonic Waveguides Using Angle-Polished Fibers," IEEE Transactions on Components, Packaging and Manufacturing Technology, vol. 3 Issue 6, pp. 954-959 (2013).

T. Sure, J. Dillon, J. Murakowski, C. Lin, D. Pustai, and D. Prather, "Fabrication and Characterization of Three-Dimensional Silicon Tapers," Optics Express, vol. 11, pp. 3555-3561 (2003).

Yariv A., "Coupled—Mode Theory for Guided-Wave Optics," IEEE Journal of Quantum Electronics, vol. QE-9, pp. 919-933 (1973).

Das A K et al: "Coupling Between SM Fiber and Polymeric Planar Thin Film Waveguide of Different Structures", Photopolymers and Applications in Holography, Optical Datastorage, Optical Sensors & Interconnects, Bellingham, WA, US, vol. 2042, Aug. 16, 1993, pp. 447-454.

M. Lipson, Research Proposal to Corning, "Enabling Seamless Fiber Connections with Silicon Photonic Chips"; Posted Jun. 24, 2013, See Abstract: http://cornell.flintbox.com/public/project/23434/.

* cited by examiner

METHODS FOR COUPLING OF WAVEGUIDES WITH DISSIMILAR MODE FIELD DIAMETERS, AND RELATED APPARATUSES, COMPONENTS, AND SYSTEMS

PRIORITY APPLICATION

This application is a continuation of International Application No. PCT/US2015/44432, filed on Aug. 10, 2015, which claims the benefit of priority under 35 U.S.C. § 119 of U.S. Provisional Application Ser. No. 62/037,747, filed on Aug. 15, 2014, the contents of which are relied upon and incorporated herein by reference in their entirety.

BACKGROUND

Coupling of waveguides with very dissimilar mode field diameters (MFDs) is a critical problem of fiber-to-chip connectivity, when a single-mode optical fiber with MFD of ~10 um has to be connected to a high-index waveguide with a sub-wavelength cross-section (e.g. a 0.2×0.5 um Si wire). Current solutions to coupling comprise, for example, butt coupling assisted by inverted taper, vertical coupling assisted by a diffraction grating; angle polished grating assisted coupling, a combination of butt coupling and evanescent coupling, evanescent coupling of the fiber core of a side polished fiber and a planar waveguide on a separate substrate (the side polished fiber and the planar waveguide are separate input/output ports). Problems of these approaches may include limited coupling efficiency (~1.5 dB) and/or low mechanical strength. Thus, there is an long-standing and unresolved need for improved coupling with dissimilar MFDs.

SUMMARY

Embodiments include a coupler design, in which a strip high index waveguide is fabricated on a flat surface of the cladding of a side polished fiber. By properly choosing parameters of the waveguide and fiber, one can achieve strong evanescent coupling between those very dissimilar waveguides, with the theoretical limit of the coupling efficiency approaching 100%. The high-index waveguide is connected to an optical chip by means of conventional tapers. A piece of the side polished fiber and the chip form a planar monolithic unit and have a high mechanical strength.

In this embodiment, a signal propagating in the core of a single mode or few-mode fiber with polished cladding is transformed to the high refractive index waveguide, fabricated on a flat surface of the fiber cladding, by means of evanescent coupling. In contrast to butt coupling, the condition of the effective coupling is not a similarity of the mode profiles in terms of high mode-field overlap, but the phase matching condition, i.e. the equality of the effective refractive indices of the modes.

Coupling from a fiber core with a relatively large mode field diameter (MDF) to a given (predefined) waveguide with a small MFD, such as a high refractive index waveguide of the optical chip, is fulfilled in a several steps. The first step is the evanescent co-directional coupling of the signal from the input waveguide to an auxiliary high-index waveguide deposited on a flat surface of the side polished fiber cladding; the transverse dimensions of this waveguide are chosen so that the phase matching condition is satisfied, and the length is chosen so that the maximum coupling efficiency is achieved. To achieve a high coupling efficiency, a certain relation between the parameters of the device (the geometrical parameters, the light wavelength and the refractive indices of all cores and cladding) are to be met. In the present ID, we determine the values of the parameters satisfying these relations. The other steps serve for connecting this auxiliary waveguide to a waveguide on the optical chip. To facilitate these steps, conventional tapers are used. In one of the proposed embodiments, the core mode of the fiber can be coupled to a non-fundamental mode of an auxiliary high-index waveguide. In this case the non-fundamental mode is converted to the fundamental mode via evanescent coupling or other mode-conversion technique like adiabatic tapering.

Advantages of the method proposed are as follows: high coupling efficiency (<1.5 dB coupling loss, theoretical efficiency limit is 100%); higher mechanical strength; possibility of new functions: selective coupling of a given mode of the input fiber to the output waveguide (de-multiplexing); electro-optical and/or mechanical control of coupling by applying electric field and/or mechanical stress.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

FIG. 2: Schematic of a evanescent coupler according to another embodiment: W1—the input waveguide, for example, the core of a single mode or a few mode fiber. W2—a single mode output waveguide, for example, a strip high-index waveguide on a chip. W2'—an auxiliary waveguide with the effective refractive index of the first or higher-order mode equal to that of the input mode of W1. W2"—an auxiliary waveguide with the effective refractive index of the first or higher-order mode equal to that of the fundamental mode of W2. Waveguides W2' and W2" are connected by an inverted taper. Step 1: evanescent coupling of the mode of W1 to the first or higher mode of W2'; Step 2: conversion of the first or higher-order mode of W2' to the mode of W2", the dimensions of the cross-section of W2" are so that the effective refractive index of the converted mode is equal to that of the fundamental mode of the output waveguide W2; Step 3—evanescent coupling of the mode guided in W2" to the fundamental mode of W2.

FIG. 4: Top left: Example of embodiment of FIG. 1, in which the thickness, h, of the high-index waveguide is constant, but the width is reduced. Bottom left: The effective index of the rectangular waveguide decreases with reduction in the width, w, and for silicon rib with w×h=160 nm×200 nm matches the effective mode index of the fiber. Top right: The mode field distribution of the rectangular waveguide (symmetric w.r.t. x=0, shown only for x>0) when it is index-matched to the fiber (w×h=160 nm×200 nm), and when it is tapered out adiabatically to a larger cross-section of a Si photonic waveguide (w×h=400 nm×200 nm). Bottom right: coupling efficiency tolerance to the variations in the width of the high-index waveguide, calculated using equation (4) in conjunction with numerically computed propagation constants.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

In contrast to butt coupling and vertical coupling, in the method proposed in this disclosure, the waveguides are parallel (planar geometry). The input waveguide, W1, shown in FIGS. 1 and 2, can be either single- or few-mode. W1 has a relatively large MFD (for typical fiber core of 5-20 µm) and low refractive index contrast ($10^{-2}$-$10^{-3}$). The output waveguide is a single-mode waveguide with relatively small cross section area and high refractive index contrast. For typical semiconductor waveguide on a chip or photonic integrated circuit, the cross section is 0.25 µm×0.50 µm and the index contrast is about 1-2. We considered two designs of the evanescent coupler (FIGS. 1 and 2).

Figure 1:
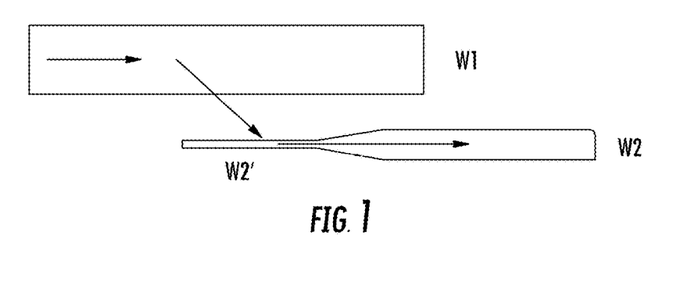
FIG. 1: Schematic of an evanescent coupler according to one embodiment: W1—the input waveguide, for example, the core of a single-mode or a few mode fiber; W2—a single-mode output waveguide, for example, a strip high-index single-mode waveguide on a chip. W2'—an auxiliary waveguide with the effective refractive index of the fundamental mode equal to that of the input mode of W1. Waveguides W2' and W2 are connected by an inverted taper.
Figure 2:
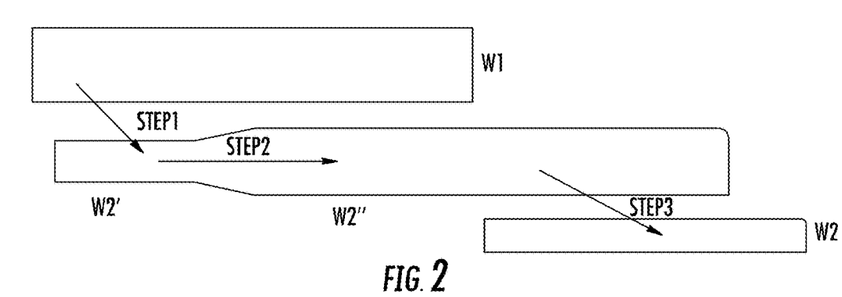
Figure 3:
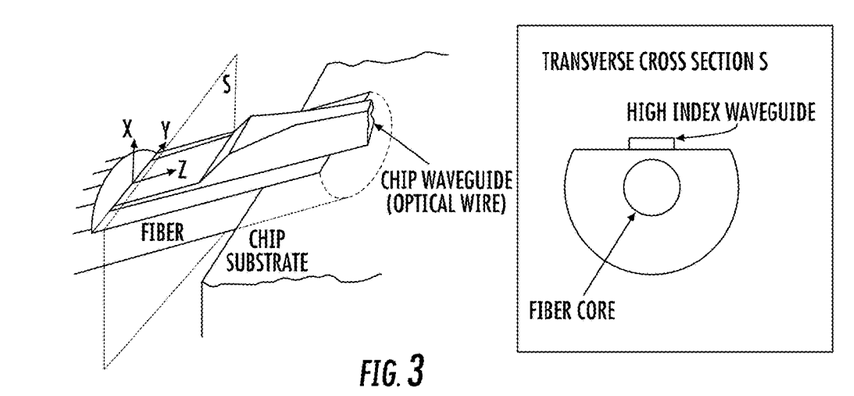
FIG. 3: Illustrative example (not to scale) of embodiment of FIG. 1. The end of a fiber is glued or fused into a trench in a silica plate and polished so that a flat surface of polished cladding becomes a part of the surface of the silica plate, which serves as a waveguide substrate. The fiber axis is parallel to the silica surface and a predefined distance between the silica surface and the fiber axis is ensured. The fiber core, the high-index waveguide, and the chip waveguide correspond to waveguides W1, W1', and W2, respectively, in FIG. 1. All the system is immersed in a medium (cladding) with the refractive index of the silica plate. The taper(s) can be both in X and Y directions.

In the embodiment of FIG. 1, the mode of the input waveguide (large MFD) is coupled to the fundamental mode of the high-index output waveguide. Matching of the propagation constants of the modes can be achieved by using a strip waveguide with a width comparable to the fiber core and a reduced thickness, as shown in FIG. 3. Alternatively, the thickness of the output waveguide can be constant, but the width is reduced to achieve matching of the propagation constant to that of the fiber (FIG. 4).

In this case the fiber can be glued or fused to a flat plate (substrate) with the refractive index close to that of the fiber cladding (for example SiO2) and after that all the system can be polished so that a flat surface comprising a part of the polished fiber cladding and a part of the plate is created. A high refractive index layer can be deposited on this flat surface so that a wafer for fabrication of an optical chip is obtained. Such a wafer has already a piece of input fiber and forms a monolithic unit with this fiber. An optical chip can be created on this wafer using standard lithography methods. This substrate will include a high index waveguide, which is parallel to the fiber core. In FIG. 1 this waveguides is denoted W2'.

Figure 4:
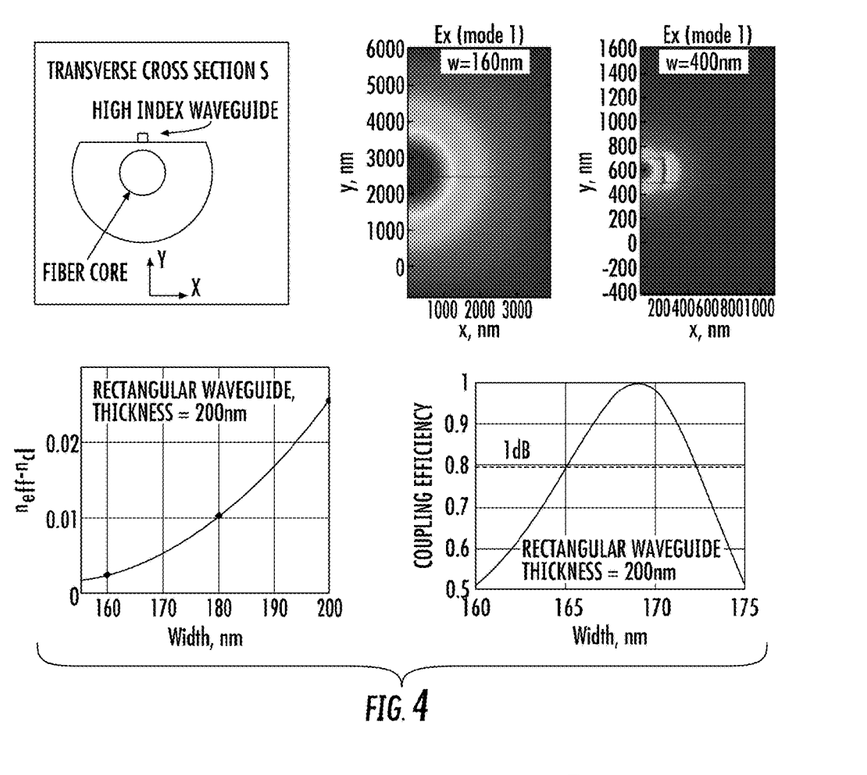
Figure 5:
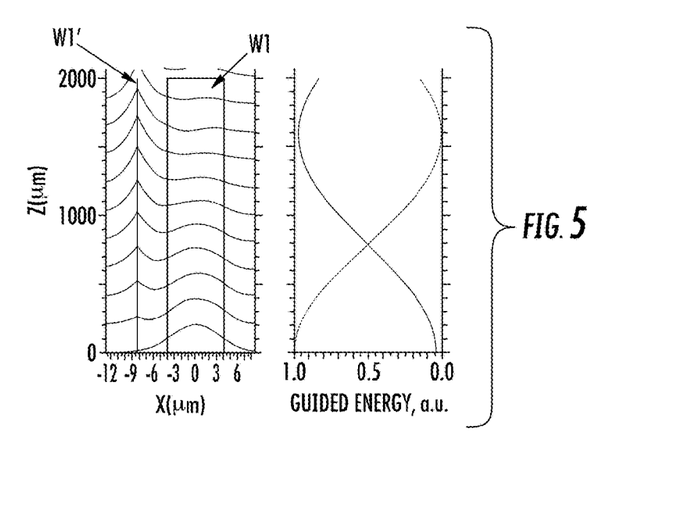
FIG. 5: Modeling of evanescent coupling of light from waveguide W1 to the fundamental mode of waveguide W2' in the embodiment of FIG. 1. Calculation was performed using the beam propagation method in 2D. The thickness of W1 is 8 □m, the thickness of W1' is 5.4 nm, the refractive index of W1 is 1.455, the refractive index of the surrounding medium (clad)=1.450, the refractive index of W1' is 3.40, the wavelength is 1.55 □m.
Figure 6:
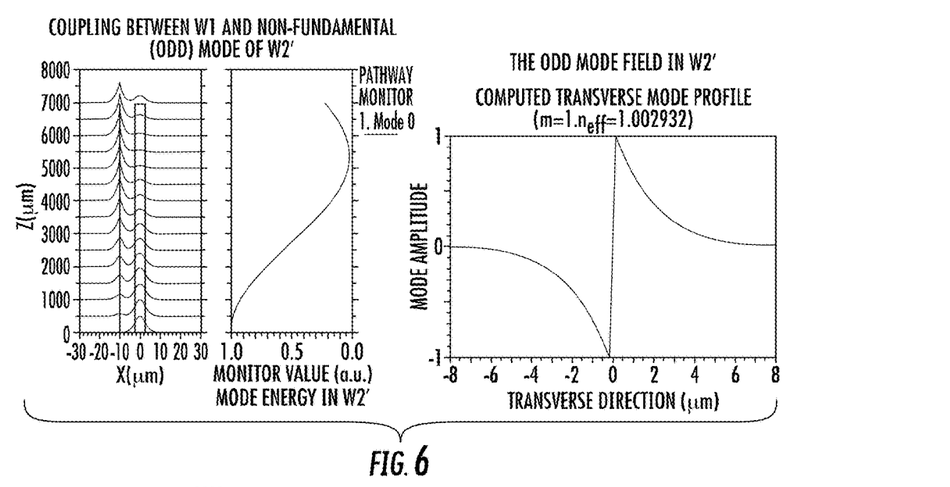
FIG. 6: Modeling of evanescent coupling of light from waveguide W1 to non-fundamental (odd) mode of waveguide W2' in the embodiment of FIG. 2. Calculation was performed using the beam propagation method in 2D. The thickness of W2' is 297 nm (a conventional Si waveguide).

For a Si waveguide with a nominal constant thickness of 200 nm, we find from numerical solutions of a 3D vector eigenvalue problem that matching of the effective index of the fundamental mode with the effective index of the fiber mode occurs for Si wire widths around 160 nm (FIG. 4). The same figure is also shown by a sample curve of the coupling efficiency tolerance to variations in the width of Si waveguide, computed using equation (4) discussed below. The coupling length for 6 µm center-to-center waveguide separation is estimated from the mode overlap integrals to be around 450 µm, after which the Si waveguide width can be tapered out adiabatically to its final value of 400 nm-500 nm.

Next, we consider high-index strip waveguides in which the thickness, rather than the width, is reduced to achieve mode index matching. Modeling done so far suggests that in the embodiment of FIG. 1 the thickness of the strip waveguide (W2' in FIG. 1) is to be rather small (from a few nanometers to a few tens of nanometers), which can be a problem for low-cost fabrication. We also note that in the embodiment of FIG. 2, in contrast to the embodiment of FIG. 1, the mode of the input waveguide (large MFD) is coupled to the nonfundamental mode of the strip waveguide. In the embodiment of FIG. 2, the thickness of waveguide W2' is found to be a few hundred nanometers, as is conventional for a photonic chip. However, relative tolerance for the waveguide transverse dimensions in the embodiment of FIG. 2 is lower than in the embodiment of FIG. 1.

The transverse dimensions (e.g., the thickness) of the auxiliary waveguide W2' are chosen so that the effective refractive indices of the fundamental modes of waveguides W1 and of W1' are equal (phase matching condition). Under that condition, according to the coupled wave theory, the efficiency of evanescent coupling is 100%. If the thickness of a rectangular waveguide is much less than its width, the optimal thickness of W2' can be estimated analytically:

$$T_{TE} \approx \frac{\lambda_0}{\pi\Delta\varepsilon}\sqrt{2n_{cl}\delta n}, \; T_{TM} = \left(\frac{n_{co}}{n_{cl}}\right)^2 T_{TE} \quad (1)$$

$T_{TE}$ and $T_{TM}$ are the optimal thicknesses of W2' for TE and TM polarizations respectively, $\Delta\varepsilon \equiv (n_{co})^2 - (n_{cl})^2$, $\delta n \equiv n_{eff} - n_{cl}$, $n_{co}$ and $n_{cl}$ are the refractive indexes of the waveguide and surrounding medium respectively, $n_{eff}$ is the effective index of the guided modes and and $\lambda$ is the wavelength. For example, for $\delta n = 5*10^{-3}$, $n_{cl} = 1.45$, $n_{co} = 3.45$, $\lambda_0 = 1.55$ μm (typical values for fiber-to-chip connectivity), $T_{TE} \approx 6.1$ nm, $T_{TM} \approx 34.3$ nm. To our knowledge, such thicknesses can be achieved using in-house capabilities developed in the Green Laser Project.

The coupling length depends on the spacing between the waveguides. For the case of thin waveguide (the thickness is much less than the width), the coupling length $L_c$ can be calculated from the Coupled Wave Theory as $$L_c(a) = L_c(a_0)\text{Exp}\left(\frac{2\pi(a-a_0)}{\lambda_0}\sqrt{n_{eff}^2 - n_{cl}^2}\right) \quad (2)$$

Figure 7:
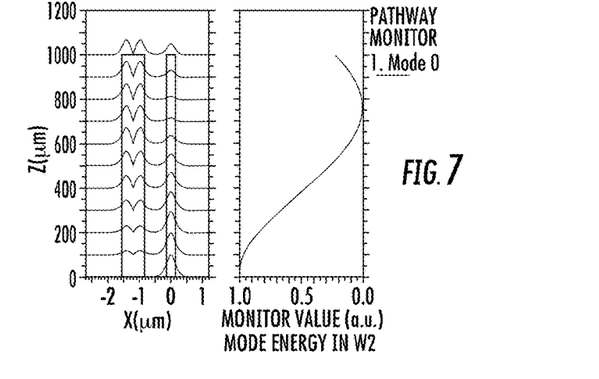
FIG. 7: Modeling of evanescent coupling between waveguide W2"(left) and the fundamental mode of waveguide W2 (right) (mode conversion) in the embodiment of FIG. 2. Calculation was performed using the beam propagation method in 2D. The thickness of W2" and W2 was 700 nm and 250 nm respectively.
Figure 8:
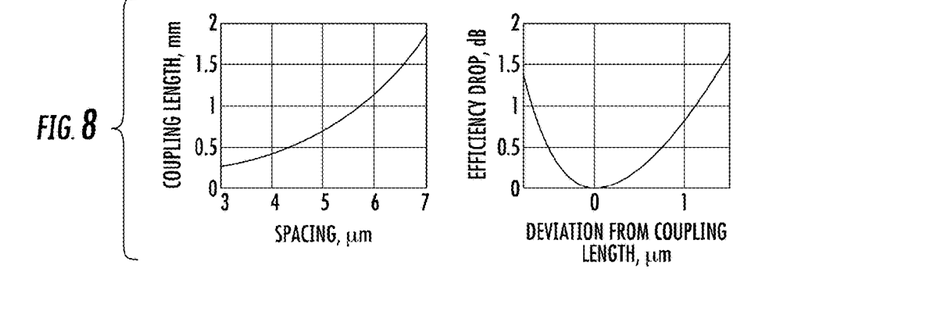
FIG. 8: Left—calculated coupling length as a function of the spacing between the waveguide axes. Right—drop in the coupling efficiency caused by deviation of the waveguide length from the coupling length, $n_{eff}^{fiber} - n_{cl} = 5*10^{-3}$, $n_{cl} = 1.45$, $n_{waveguide} = 3.45$, the thickness<<the width.

An example of this dependence is shown in FIG. 7.

Tolerance for the Waveguide Length:

according to the Coupled Wave Theory, the coupling efficiency is related to the length of the waveguide W2' (FIGS. 1 and 2) as $$\text{Efficiency}(z) = \sin^2\left(\frac{\pi}{2L_c}z\right) \quad (3)$$

For $z = L_c$ the coupling efficiency is 100%. According to Eq. (2), the deviation, $\Delta z$ (the tolerance for z), from this optimal value, which causes 1 dB drop in efficiency is $0.3 L_c$. Thus, for $L_c = 600$ μm, the tolerance to z is 180 μm, which is pretty high.

Tolerance to Spacing Between the Waveguides:

From FIG. 7 one can see that the tolerance to spacing is on the order of 1 μm.

Figure 9:
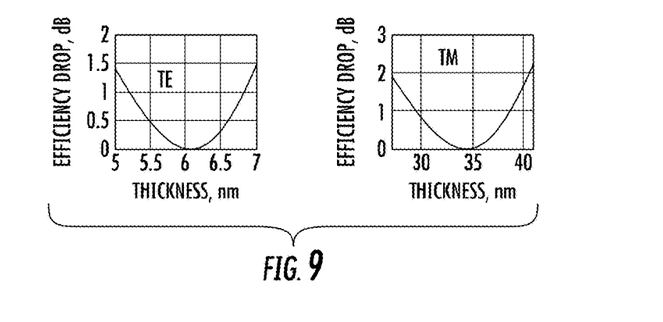
FIG. 9: Coupling efficiency as a function of the waveguide thickness for the coupling length of 0.3 mm. Left—TE polarization, right—TM polarization. $n_{cl} = 1.45$, $n_{waveguide} = 3.45$, the thickness<<the width. The relative tolerance, $\Delta T/T \approx 13\%$.

Tolerance to the Cross-Section of the Waveguide:

Deviation of the waveguide thickness from the optimum causes breaking the phase matching condition that results in the drop in the coupling efficiency. According to the Coupled Wave Theory, $$\text{Efficiency}(T) = \frac{1}{1+\left(\frac{\Delta\beta(T)}{2\kappa}\right)^2} \quad (4)$$

where T stands for the waveguide dimensions (the thickness and/or width), $\Delta\beta$ is the deviation of the propagation constant difference from the resonant value. Calculated results for a flat waveguide (thickness<<width) is shown in FIG. 9. Note that for a nanoscale thickness of the waveguide the requirement to its uniformity is not strict: ~13% variation is acceptable.

Figure 10:
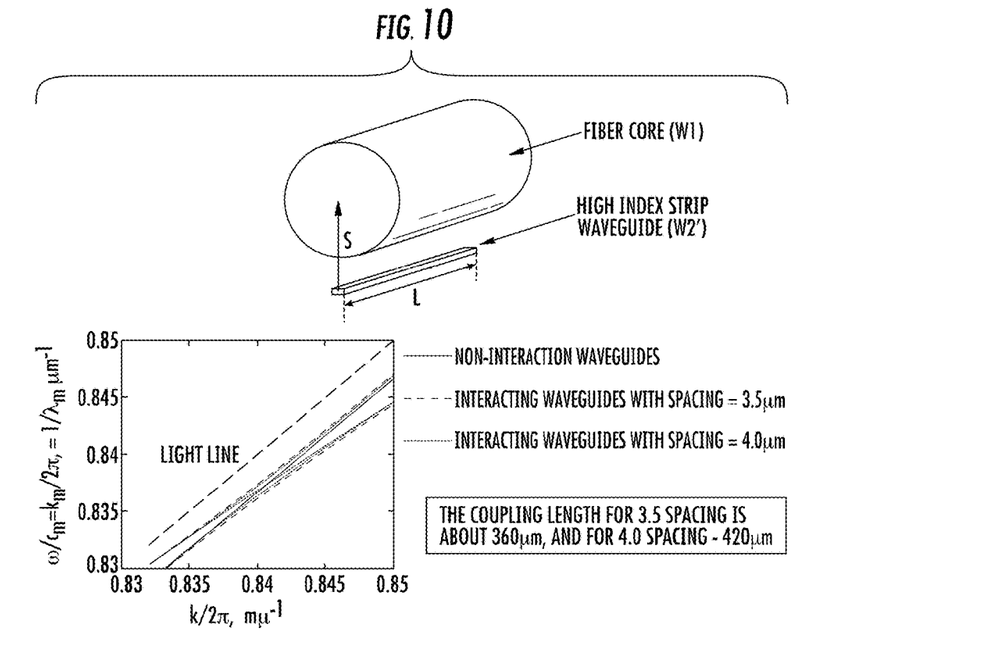
FIG. 10: Evaluation of the coupling length for singe mode fiber evanescently coupled to high-index strip waveguide, cross section—420 (width)×250 (thickness) $nm^2$. The coupling length is calculated from the splitting of the dispersion curves (bottom plot) at the phase matching conditions (the crossing points of the green lines). Calculation of the dispersion curves was performed using MIT Photonic Bands code in 3D.

Evaluation of the coupling length for a fiber-strip waveguide system in 2D is shown in FIG. 10.

Figure 11:
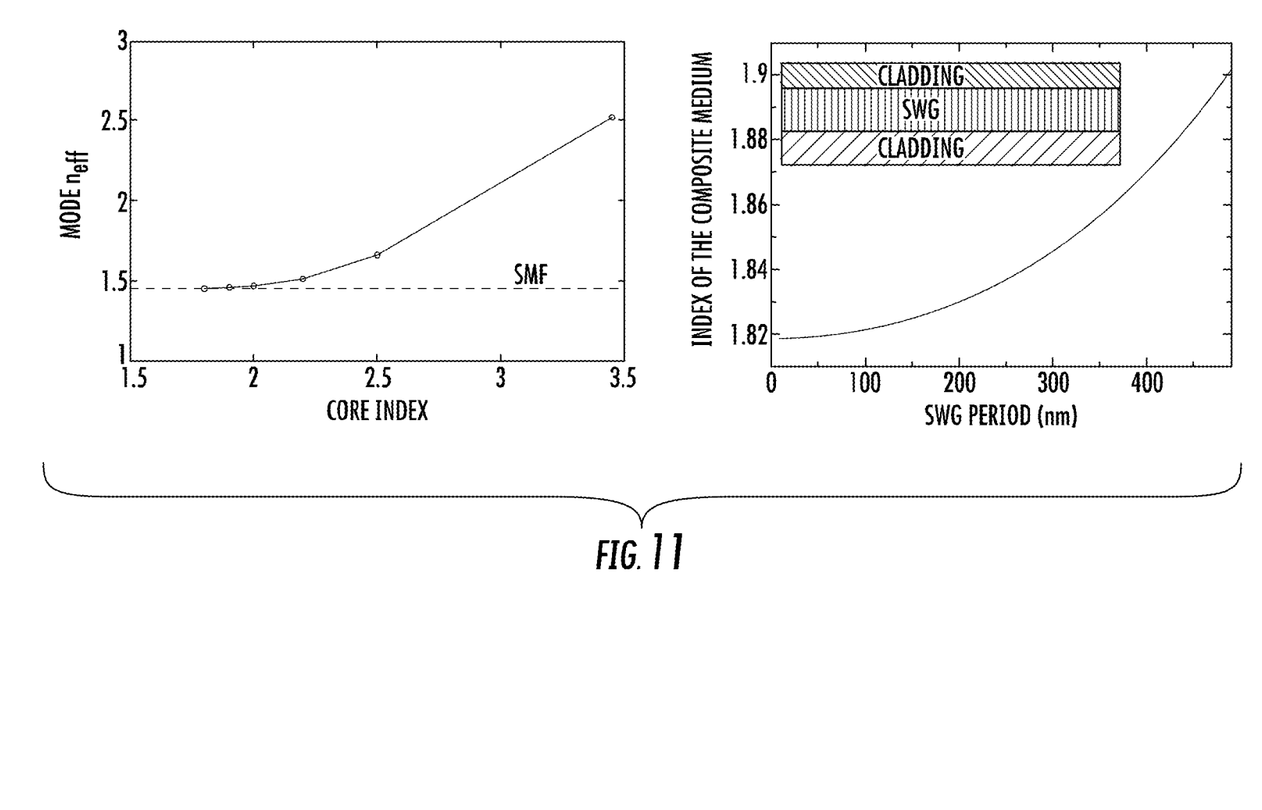
FIG. 11: Left: Dependence of the effective index of the fundamental mode of the Si strip waveguide (500 nm width×250 nm height) on the value of the core index. Right: Refractive index of the SWG composite medium as a function of the period of the sub-wavelength grating for Si fraction of 0.12. The inset shows a schematic of the Si SWG structure deposited on a polished fiber cladding, with a period decreasing toward the strip Si-waveguide section, with constant Si fraction. An index matching medium is used at the top of the grating.

Yet another approach to matching the propagation constants of the fiber and Si waveguide modes is to reduce the refractive index of the Si waveguide core in the region of evanescent coupling. This can be achieved by micro-structuring the Si wire waveguide to have an effective material refractive index value for which the fundamental mode is index-matched to the mode of the fiber. FIG. 11 (left) shows the change in the effective index of the Si waveguide fundamental mode, with reduction in the material refractive index $n_{core}$ of the modified Si waveguide core, for standard dimensions of the waveguide (500 nm width×250 nm height) and Si-photonics polarization (field parallel to the substrate). For $n_{core} < 1.9$ index the effective index of the modified Si waveguide can equal that of the SMF.

In practice, the reduction of the Si waveguide core index can be achieved by using a Sub-Wavelength Grating (SWG) structure that is defined lithographically at the same time as other Si-photonic chip components. The SWG, by virtue of its grating period being much smaller than the wavelength, functions as a material with an effective index determined by the period and duty cycle of the grating, and by the refractive index values of the grating materials. Using Si and a fiber cladding index matching medium as the grating components, an index range of ~1.6-3.5 can be engineered. The period and duty cycle of the SWG can be adiabatically adjusted to change the mode index from the value matched to the mode of the SMF in the evanescent coupling region, up to the standard Si waveguide mode effective index. This transition can also be realized in conjunction with the tapering of the SWG waveguide width, to realize an advantage of a larger coupling coefficient for a wider Si waveguide width in the evanescent coupling region.

The period of the SWG structure that is required to achieve a modified Si core index of 1.9 can be estimated to be around 485 nm from an effective medium theory for SWGs with Si segments of ~60 nm in thickness, FIG. 11 (right). This estimate constitutes a lower bound, since the finite height of the grating elements contributes to the overall reduction in the index of the composite medium, and hence thicker Si segments can lead to the core index of 1.9 for a given period. Refractive index engineering via use of SWG with application to fiber-to-chip coupling was demonstrated experimentally in the context of an end-to-end coupling approach described in, where it was also shown that Si-photonic SWGs have a relatively low propagation loss of ~2 dB/cm.

The embodiment of FIG. 2 differs from the embodiment of FIG. 1 in that the mode of the input waveguide (large MFD) is coupled to the non fundamental mode of the strip waveguide. In this case the thickness of waveguide W2' (FIG. 2) is found to be greater (few hundred nanometers, conventional for a photonic chip). However, the tolerance for the waveguide transverse dimensions in the embodiment of FIG. 2 is lower than in the embodiment of FIG. 1. Thus, for the waveguide with the optimal width=420 nm and the optimal thickness=250 nm (FIG. 10), the 1 dB drop tolerance was found to be about 2 nm.

Many modifications and other embodiments of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A waveguide coupling assembly comprising:
   an input waveguide having a first mode; and
   a transition waveguide disposed in a substrate, the transition waveguide comprising:
      a first transition waveguide section having a second mode, the first transition waveguide section being disposed proximate to the input waveguide such that a phase matching condition is achieved between the input waveguide and the first transition waveguide section, thereby evanescently coupling the input waveguide to the first transition waveguide section of the transition waveguide;
      a second transition waveguide section having a third mode larger than the second mode of the first transition waveguide section; and
      a tapered section optically connected between the first transition waveguide section and the second transition waveguide section, such that the second mode of the first transition waveguide section is converted to the third mode of the second transition waveguide section by the tapered section,
   wherein the first mode of the input waveguide is equal to the third mode of the second transition waveguide section of the transition waveguide.

2. The waveguide coupling assembly of claim 1, wherein the input waveguide is disposed in a substrate.

3. The waveguide coupling assembly of claim 1, wherein the first mode of the input waveguide is a fundamental mode of the input waveguide having a first effective refractive index; and
   the second mode of the first transition waveguide section is a fundamental mode of the first transition waveguide section having a second effective refractive index equal to the first effective refractive index of the fundamental mode of the input waveguide.

4. The waveguide coupling assembly of claim 1, wherein:
   the first mode is a fundamental mode of the input waveguide; and
   the third mode is a fundamental mode of the second transition section of the transition waveguide.

5. The waveguide coupling assembly of claim 1, further comprising an output waveguide having at least one fourth mode, the output waveguide being disposed proximate to the second transition section of the transition waveguide such that a phase matching condition is achieved between the second transition waveguide section and the output waveguide, thereby evanescently coupling the second transition waveguide section of the transition waveguide to the output waveguide.

6. The waveguide coupling assembly of claim 5, wherein the output waveguide is disposed in a substrate.

7. The waveguide coupling assembly of claim 5, wherein the first mode of the input waveguide is a fundamental mode of the input waveguide having a first effective refractive index;
   the second mode of the first transition waveguide section is a higher order mode of the first transition waveguide section having a second effective refractive index equal to the first effective refractive index of the fundamental mode of the input waveguide;
   the third mode of the second transition waveguide section has a third effective refractive index; and
   the fourth mode of the output waveguide is a fundamental mode of the output waveguide having a fourth effective refractive index equal to the third effective refractive index of the third mode of the second transition waveguide section.

8. The waveguide coupling assembly of claim 5, wherein the first mode of the input waveguide is equal to the fourth mode of the output waveguide.

9. The waveguide coupling assembly of claim 8, wherein the first mode is a fundamental mode of the input waveguide; and
   the fourth mode is a fundamental mode of the output waveguide.

10. A method of evanescently coupling a plurality of waveguides, the method comprising:
    providing an input waveguide having a first mode;
    providing a transition waveguide comprising:
       a first transition waveguide section having a second mode,
       a second transition waveguide section having a third mode larger than the second mode of the first transition waveguide section; and
       a tapered section optically connected between the first transition waveguide section and the second transition waveguide section; and
    disposing the transition waveguide in a substrate;
    disposing the first transition waveguide proximate to the input waveguide such that a phase matching condition is achieved between the input waveguide and the first transition waveguide section, thereby evanescently coupling the input waveguide to the first transition waveguide section of the transition waveguide,
    wherein the first mode of the input waveguide is equal to the third mode of the second transition waveguide section of the transition waveguide.

11. The method of claim 10, further comprising disposing the input waveguide in a substrate.

12. The method of claim 10, wherein the first mode of the input waveguide is a fundamental mode of the input waveguide having a first effective refractive index; and
    the second mode of the first transition waveguide section is a fundamental mode of the first transition waveguide section having a second effective refractive index equal to the first effective refractive index of the fundamental mode of the input waveguide.

13. The method of claim 10, wherein:
the first mode is a fundamental mode of the input waveguide; and
the third mode is a fundamental mode of the second transition section of the transition waveguide.

14. The method of claim 10, further comprising disposing an output waveguide having at least one fourth mode proximate to the second transition section of the transition waveguide such that a phase matching condition is achieved between the second transition waveguide section and the output waveguide, thereby evanescently coupling the second transition waveguide section of the transition waveguide to the output waveguide.

15. The method of claim 14, further comprising disposing the output waveguide in a substrate.

16. The method of claim 14, wherein the first mode of the input waveguide is a fundamental mode of the input waveguide having a first effective refractive index;
the second mode of the first transition waveguide section is a higher order mode of the first transition waveguide section having a second effective refractive index equal to the first effective refractive index of the fundamental mode of the input waveguide;
the third mode of the second transition waveguide section has a third effective refractive index; and
the fourth mode of the output waveguide is a fundamental mode of the output waveguide having a fourth effective refractive index equal to the third effective refractive index of the third mode of the second transition waveguide section.

17. The method of claim 14, wherein the first mode of the input waveguide is equal to the fourth mode of the output waveguide.

18. The method of claim 17, wherein the first mode is a fundamental mode of the input waveguide; and
the fourth mode is a fundamental mode of the output waveguide.

19. A waveguide coupling assembly comprising:
an input waveguide having a first mode;
a transition waveguide disposed in a substrate, the transition waveguide comprising:
a first transition waveguide section having a second mode, the first transition waveguide section being disposed proximate to the input waveguide such that a phase matching condition is achieved between the input waveguide and the first transition waveguide section, thereby evanescently coupling the input waveguide to the first transition waveguide section of the transition waveguide;
a second transition waveguide section having a third mode larger than the second mode of the first transition waveguide section; and
a tapered section optically connected between the first transition waveguide section and the second transition waveguide section, such that the second mode of the first transition waveguide section is converted to the third mode of the second transition waveguide section by the tapered section, wherein:
the first mode of the input waveguide is equal to the third mode of the second transition waveguide section of the transition waveguide,
the first mode of the input waveguide is a fundamental mode of the input waveguide and the third mode of the second transition waveguide section is a fundamental mode of the second transition waveguide section of the transition waveguide; and
an output waveguide having at least one fourth mode, the output waveguide disposed proximate to the second transition waveguide section of the transition waveguide such that a phase matching condition is achieved between the second transition waveguide section of the transition waveguide and the output waveguide, thereby evanescently coupling the second transition waveguide section of the transition waveguide to the output waveguide.

\* \* \* \* \*